United States Patent [19]
Burgdorf et al.

[11] 4,306,636
[45] Dec. 22, 1981

[54] FLOATING-CALIPER SPOT-TYPE DISC BRAKE

[75] Inventors: Jochen Burgdorf, Offenbach-Rumpenheim; Karl Storzel, Sprendlingen, both of Fed. Rep. of Germany

[73] Assignee: ITT Industries, Inc., New York, N.Y.

[21] Appl. No.: 114,548

[22] Filed: Jan. 23, 1980

[30] Foreign Application Priority Data

Feb. 26, 1979 [DE] Fed. Rep. of Germany ....... 2907517

[51] Int. Cl.³ .................... F16D 65/02; F16D 69/02
[52] U.S. Cl. ................................................ 188/73.43
[58] Field of Search .................. 188/72.4, 73.1, 73.3, 188/73.4, 73.5, 73.6

[56] References Cited

U.S. PATENT DOCUMENTS

| | | | |
|---|---|---|---|
| 3,403,756 | 10/1968 | Thiron | 188/73.3 |
| 3,885,651 | 5/1975 | Odier | 188/73.5 |
| 3,920,104 | 11/1975 | Huffmann | 188/73.1 |
| 4,171,037 | 10/1979 | Souma et al. | 188/73.6 |
| 4,276,965 | 7/1981 | Pickel | 188/73.5 |

FOREIGN PATENT DOCUMENTS

| | | | |
|---|---|---|---|
| 1914100 | 10/1970 | Fed. Rep. of Germany | 188/73.3 |
| 2404486 | 8/1975 | Fed. Rep. of Germany | 188/73.1 |
| 2558141 | 7/1976 | Fed. Rep. of Germany | 188/73.3 |
| 2800502 | 7/1978 | Fed. Rep. of Germany | 188/73.5 |
| 2811848 | 9/1978 | Fed. Rep. of Germany | 188/73.5 |
| 2718483 | 11/1978 | Fed. Rep. of Germany | 188/73.3 |
| 2275690 | 1/1976 | France | 188/73.3 |
| 46-39370 | 11/1971 | Japan | 188/73.5 |
| 7512374 | 4/1977 | Netherlands | 188/73.3 |
| 2039645 | 7/1980 | United Kingdom | 188/73.5 |

*Primary Examiner*—David L. Lacey
*Attorney, Agent, or Firm*—John T. O'Halloran; Alfred C. Hill

[57] ABSTRACT

In a disc brake having a caliper axially movably guided at two parallel arms of a brake support and having a first brake shoe supported in the caliper and a second brake shoe supported and guided by the arms of the brake support, an arrangement provides a connection between the second brake shoe and one of the caliper and the brake support such that the caliper can follow the tangential movement of the first brake shoe when it is loaded during operation of the brake. By this arrangement uneven wear of the pads of the brake shoes is avoided.

7 Claims, 2 Drawing Figures

FLOATING-CALIPER SPOT-TYPE DISC BRAKE

BACKGROUND OF THE INVENTION

This invention relates to a floating-caliper spot-type disc brake with a rotating brake disc, a non-rotating brake support member which is secured in position on one side of the brake disc, partly extends across the periphery of the brake disc, guides a brake caliper axially slidably between guiding surfaces parallel to the brake-disc axis and supports the caliper in the circumferential direction of the brake disc. The brake caliper is connected to brake shoes disposed on opposite sides of the brake disc via its legs extending parallel to the brake disc, a first brake shoe of which is guided and supported in the brake support member on the fastening side of the brake support member.

A floating-caliper spot-type disc brake of the aforementioned type is known from German Pat. DE-OS No. 2,408,519. The brake support member projects above the brake disc with two arms which extend parallel to the brake-disc axis and have confronting projections on both sides of the brake disc whose ends form the guiding surfaces. The projections engage into guiding grooves of the brake caliper whose bottom surfaces extend parallel to the brake-disc axis. The clearance between the guiding surfaces and the groove bottoms being low, ease of axial slidability of the brake caliper is ensured.

The brake shoe located on the fastening side of the brake support member is movable into engagement with the brake disc by an actuating piston arranged in the leg of the brake caliper, while the brake shoe associated with the other leg is in positive engagement with the brake-caliper leg and is moved into engagement with the brake disc through the reaction force of the actuating piston. When rotation of the brake disc is slowed down, first the brake shoe close to the piston and supported in the brake support member will move into engagement with the brake disc, thereby transmitting all frictional forces occurring to the brake support member direct. Only then will the brake shoe secured in position in the brake-caliper leg move into engagement with the brake disc and the frictional forces tend to displace the brake caliper in the main direction of rotation of the brake disc in order to support the caliper at the brake support member's guiding surfaces provided. However, since on the side close to the brake support member the brake caliper is in frictional engagement with the brake support member through the piston frictionally engaged with the brake shoe supported in the brake support member, overcoming of the clearances between brake caliper and brake support member caused by the guidings will cause the brake caliper to assume an inclined position resulting in wedge-shaped wear of the brake shoes. When the disc brake is released, the brake caliper will no longer return to its initial position, and on another braking operation its angle of inclination will become still greater until the brake caliper is supported by abutment on the guiding surfaces on the disc exit and disc entry sides, resulting in maximum wedge-shaped wear. At this stage, any further increase in the angle of inclination is only possible by deflection of the arm projecting above the brake disc and serving as a support for the brake caliper.

SUMMARY OF THE INVENTION

It is an object of the present invention to prevent the inclination of the brake caliper occurring as a result of uncontrolled overcoming of the existing guiding clearances in order to thus reduce wedge-shaped wear. A feature of the present invention is the provision of a floating-caliper spot-type disc brake comprising a rotating brake disc having an axis of rotation; a brake caliper having a pair of legs parallel to the disc, each of the pair of legs being diposed on a different side of the disc; a non-rotating brake support member secured in position on one side of the disc, the support member partly extending across the periphery of the disc, guiding the brake caliper axially slidable between guiding surfaces parallel to the axis and supporting the caliper in the circumferential direction of the disc; a pair of brake shoes each being disposed on a different side of the disc and associated with a different one of the legs, a first of the pair of brake shoes being in a supporting relation with the support member on the one side of the disc; and a means disposed on the one side of the disc between the first of the pair of brake shoes and one of the caliper and the support member to enable that one of the pair of legs associated with the first of the pair of brake shoes to follow the travel of displacement of the other of the pair of legs caused by a braking force.

It is ensured by this arrangement that to overcome the guiding clearance the brake caliper is only displaceable parallel to its inactivate position in the circumferential direction of the brake disc. In other words, the legs of the brake caliper are always parallel to the brake disc. This arrangement largely obviates the occurrence of wedge-shaped wear caused by the guiding clearance.

The design according to the present invention is of particular importance in floating-caliper spot-type disc brakes having separate guiding surfaces which are arranged on opposite sides of the brake disc and whose clearance relative to the brake caliper on the fastening side of the brake support member is greater than that of the guiding surfaces arranged on the side of the brake disc opposite the fastening side of the brake support member.

This supporting of the brake caliper will counteract the inclination of the brake caliper in the event of deflection of the brake support member arm located on the disc exit side, because the brake caliper's leg lying on the fastening side of the brake support member can always be made to follow the displaced leg in parallel.

In a brake shoe composed of a backing plate and a brake pad, the support can be accomplished in that the brake shoe supported in the brake support member, on the side of its backing plate close to the brake caliper's leg, or the head of the actuating piston close to the brake shoe, carries a slide lining forming the support for the leg. This enables the leg to slide on the backing plate in the circumferential direction of the brake disc largely free from frictional forces. This embodiment proves particularly advantageous because it enables the wedge-shaped wear to also be reduced in existing systems by exchanging the brake shoes.

In another embodiment, a pressure-proof lining is arranged between the brake shoe supported in the brake support member and the actuating piston, which lining is elastic in the circumferential direction of the brake disc. This arrangement, too, results in a marked reduction of the wedge-shaped wear without necessitating major manipulation on a floating-caliper spot-type disc brake.

In another advantageous embodiment of the supporting, the first brake shoe is supported in the brake support member through a resilient arrangement and becomes movable as a result of its frictional engagement with the brake caliper's leg through the piston so that it is able to follow the travel of displacement of the other leg.

The resilient arrangement is designed such that following abutment of the brake caliper on the guiding surface when a load is applied, it will yield by an amount precisely corresponding to the travel of displacement of the supporting arm carrying the guiding surface, which displacement is caused by the braking force. This will compensate for the inclination of the brake caliper caused by the circumferential force.

Because the brake shoe is supported through a resilient arrangement only in the main direction of the brake-disc rotation, the necessary structural requirements are kept at a minimum. The main direction of brake-disc rotation corresponds to the forward driving direction of vehicles. Because the maximum braking forces and, thus, the maximum inclinations of the brake caliper occur primarily during forward running of the vehicle, they can be compensated for by this design.

Another supporting possibility is provided by the insertion of an intermediary between actuating piston and brake shoe, which is movable in the brake-disc circumferential direction between limits and is held in a central position relative to the piston by resilient means. It is thereby possible to integrate a device compensating the displacement of the brake caliper into the actuating piston.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
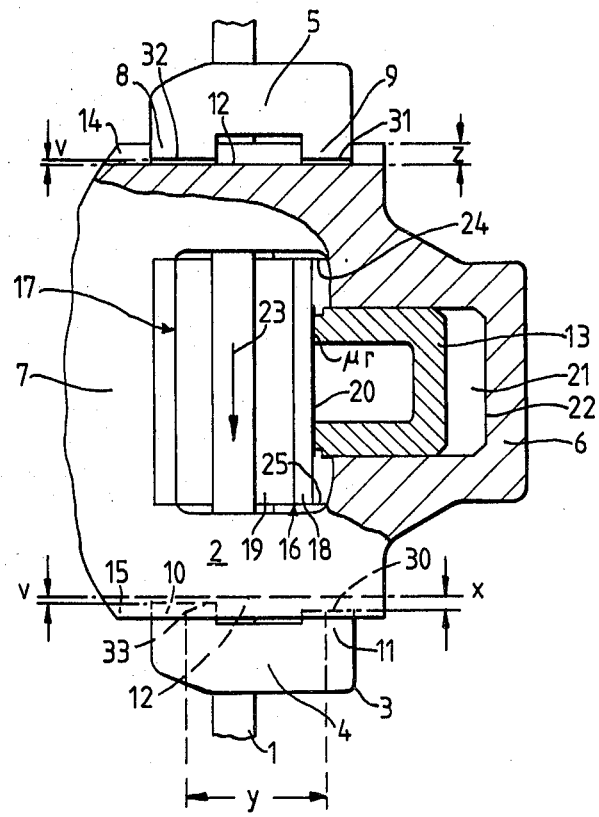
FIG. 1 is a diagrammatic top plan view of one embodiment of a floating-caliper spot-type disc brake in accordance with the principals of the present invention.

In FIG. 1, the brake disc is assigned reference numeral 1, the brake caliper numeral 2, and the brake support member numeral 3. Brake support member 3 has two arms 4 and 5 which extend across brake disc 1 between which brake caliper 2 is guided and held. For this purpose, arms 4 and 5 include projections 8, 9, 10 and 11 on either side of the brake disc, which engage guiding grooves 14 and 15 of brake caliper 2 which are parallel to arms 4 and 5.

Projections 8, 9 and 10 are of identical design and the clearance v between their ends 31, 32 and 33 and the groove bottom 12 in brake caliper 2 is relatively small, while projection 11 is smaller so that its end 30 has a defined clearance x relative to groove bottom 12 in brake caliper 2 which is larger than clearance v. Brake caliper 2 has two legs 6 and 7 extending parallel to brake disc 1, with leg 6 incorporating a hydraulic actuating device having a piston 13. Brake shoes 16 and 17 are arranged on either side of brake disc 1. Brake shoe 16 is directly supported between arms 4 and 5 of brake support member 3 at surfaces 24 and 25 and movable into engagement with brake disc 1 by piston 13, while brake shoe 17 is directly supported in brake caliper 2 on th side of brake disc 1 opposite piston 13.

Brake shoe 16 which is composed of brake pad 19 and backing plate 18 carries on the side close to piston 13 a slide lining 20 having a coefficient of friction as low as possible. In this embodiment illustrated, PTFE-coated sheet steel may be used, for example, so as to enable the piston to slide across backing plate 18 in the brake-disc circumferential direction practically without friction.

With the admission of brake pressure fluid into cylinder 21, piston 13 will move brake shoe 16 into engagement with brake disc 1. The frictional force occurring between brake shoe 16 and brake disc 1 will immediately bring brake shoe 16 into abutment with supporting surface 25 in brake support member 3. The ensuing reaction force on the cylinder bottom 22 will displace brake caliper 2 and brake shoe 17 will likewise be moved into frictional engagement with brake disc 1. The frictional forces occurring between brake shoe 17 and brake disc 1 will be directly transmitted to brake caliper 2. These circumferential forces will entrain brake caliper 2 in the main direction 23 of brake-disc rotation until it abuts on supporting surface 33 of brake support member arm 4. During this displacement, leg 6 of brake caliper 2 will follow the movement of leg 7 because it is able to slide practically friction-less on backing plate 18 of brake shoe 16 due to slide lining 20. It is thereby ensured that brake caliper 2 abuts the supporting surfaces on the disc exit side without assuming an inclined position in order to transmit the circumferential forces occurring.

In a particularly advantageous embodiment, a clearance x is assigned to brake caliper 2 relative to supporting surface 12 on the side of brake support member 3, so that it has a greater limited movability in the circumferential direction of brake disc 1. When brake caliper 2 is in abutment with guiding surface 33, it will transfer the circumferential forces occurring to brake support member arm 4 directly. Due to the free length of brake support member arm 4, it will bend as a result of material elasticity. Thus, leg 7 of brake caliper 2 is shifted in the main direction of brake-disc rotation and would cause brake caliper 2 to assume an inclined position. However, because of the specially designed friction lining 20 on the side of backing plate 18 close to brake caliper 2, and because of the correspondingly designed clearance x at projection 11, leg 6 will follow the displacement of leg 7 with nearly no friction. Thus, displacement of brake caliper 2 can only be accomplished parallel to brake disc 1, and an inclination of legs 6 and 7 eventually causing wedge-shaped wear of brake shoes 16 and 17 is largely avoided. On termination of the braking operation, arm 4 of brake support member 3, due to its material elasticity, will return brake caliper 2 to its inactivate position.

Figure 2:
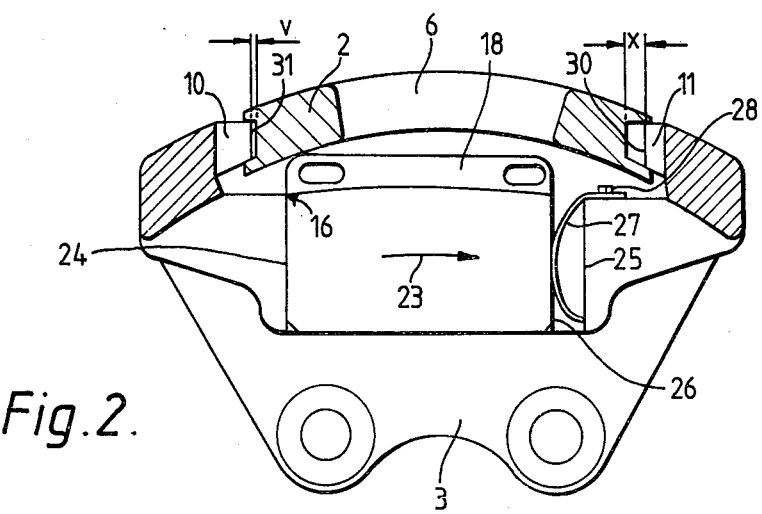
FIG. 2 is a diagrammatic end view of another embodiment of a floating-caliper spot-type disc brake in accordance with the principals of the present invention having a resilient arrangement to support a brake shoe in the brake support member.

FIG. 2 shows another embodiment of this invention according to which leg 6 is enabled to follow the displacement of leg 7. Like parts have been assigned like reference numerals as in FIG. 1. In the main direction 23 of brake-disc rotation, brake shoe 16 which is movable by piston 13 is not directly supported on supporting surface 25 of brake support member 3. A spring 27 is inserted between supporting surface 25 of brake support member 3 and the side 26 of brake shoe 16 adjacent supporting surface 25. Spring 27 is held at brake support member 3 by a screw 28. The resilience of spring 27 is progressive so that spring 27 can be compressed at least by amount v without requiring a high amount of force. However, after its compression by amount v its resilience corresponds to the material elasticity of brake support member arm 4. Thus, in a braking operation the force acting on spring 27 will compress spring 27 by precisely the amount that corresponds to the travel of displacement of leg 7 in the main direction 23 of rotation of brake disc 1. Since in this embodiment piston 13 is in frictional engagement with backing plate 18 of brake shoe 16, brake shoe 16 will entrain leg 6 of brake caliper 2 likewise in the main direction of brake-disc rotation. It is thereby achieved that legs 6 and 7 are displaced in parallel so that the brake caliper legs will maintain their position parallel to brake disc 1. An inclination of brake caliper 2 is largely avoided, and wedge-shaped wear of brake shoes 16 and 17 is reduced materially. In both embodiments as well as in other embodiments it must be ensured that the amount z by which projections 8, 9, 10 and 11 engage guiding grooves 14 and 15 is so chosen that in the presence of maximum displacement of brake caliper 2 in the circumferential direction of brake disc 1 projections 8, 9, and 10, 11 cannot be disengaged from their guiding grooves 14 and 15, respectively.

It is understood that the embodiments shown here are far from being exhaustive as regards the various possibilities of providing a support. Thus, other known supports could be provided between brake shoe 16 and piston 13 to enable leg 6 to follow the movement of leg 7. One possibility would be, for example, to arrange a pivoted ball between piston 13 and brake shoe 16. Another means would be to insert an intermediary into piston 13 which is movable relative to the piston in the circumferential direction of brake disc 1 between limits and is frictionally engaged with brake shoe 16.

While we have described above the principles of our invention in connection with specific apparatus it is to be clearly understood that this description is made only by way of example and not as a limitation to the scope of our invention as set forth in the objects thereof and in the accompanying claims.

We claim:
1. A floating-caliper spot-type disc brake comprising:
   a rotating brake disc having an axis of rotation and a main direction of rotation about said axis;
   a brake caliper having a pair of legs parallel to said disc and a pair of spaced guide grooves parallel to and on opposite sides of said axis, each of said pair of legs being disposed on a different side of said disc;
   a non-rotating brake support member secured in position on one side of said disc, said support member having a pair of spaced arms extending across the periphery of said disc parallel to and on opposite sides of said axis, each of said pair of arms having a pair of projections each extending inwardly toward said axis and disposed on a different side of said disc engaging an associated one of said pair of grooves to guide said caliper axially and to support said caliper in a circumferential direction of said disc, each of said projections of each of said pair of projections having a length to prevent disengagement thereof from an associated one of said pair of grooves in the presence of a maximum displacement of said brake caliper in said circumferential direction of said disc;
   a pair of brake shoes each being disposed on a different side of said disc, a first of said pair of brake shoes being supported between said pair of arms on said one side of said disc and movable into engagement with said disc by an actuating piston contained in one of said pair of legs disposed on said one side of said disc and a second of said pair of brake shoes being directly supported in the other of said pair of legs disposed on the other side of said disc; and
   a means disposed on said one side of said disc between said first of said pair of brake shoes and one of said piston and said support member to enable said one of said pair of legs to follow a displacement of said other of said pairs of legs transverse to said axis caused by a braking force.
2. A disc brake according to claim 1, wherein
   the clearance between a bottom of one of said pair of grooves adjacent a disc exit side of said brake and an adjacent end of an associated one of said projections against said one side of said disc is greater than the clearance between a bottom of both of said pair of grooves and an adjacent end of an associated one of said projections adjacent said other side of said disc.
3. A disc brake according to claims 1 or 2 wherein said first of said pair of brake shoes includes:
   a backing plate having a first surface parallel to and adjacent said disc and a second surface parallel to said first surface adjacent an adjacent end of said piston, and
   a brake pad fastened to said first surface of said backing plate;
   and said means includes:
   a slide lining fastened to only said second surface of said backing plate in substantially frictionless sliding engagement with said adjacent end of said piston.
4. A disc brake according to claims 1 or 2, wherein said first of said pair of brake shoes include
   a backing plate having a first surface parallel to and adjacent said disc and a second surface parallel to said first surface adjacent an adjacent end of said piston, and
   a brake pad fastened to said first surface of said backing plate; and
   said means includes
   a pressure-proof lining fastened to only said second surface of said backing plate in engagement with said adjacent end of said piston, said lining being elastic in said circumferential direction.
5. A disc brake according to claims 1 or 2, wherein said means includes
   a resilient arrangement disposed between said support member and said first of said pair of brake shoes.
6. A disc brake according to claim 5, wherein
   said resilient arrangement is constructed such that it has a progressive resilient characteristic to cause said resilient arrangement to yield by an amount precisely corresponding to said displacement of said other of said pair of legs after said projection on said other side of said disc has moved into abutment with a bottom of one of said pair of grooves adjacent a disc exit side of said brake.
7. A disc brake according to claim 5, wherein said resilient arrangement is disposed between said support member and only one edge of said first of said pair of brake shoes in said main direction of rotation of said disc.

* * * * *